US006089452A

United States Patent [19]

Rhode, III

[11] Patent Number: 6,089,452

[45] Date of Patent: Jul. 18, 2000

[54] OPERATOR'S LICENSE VALIDATION SYSTEM

[76] Inventor: Edward W. Rhode, III, 231 E. Adams St., Sandusky, Ohio 44870

[21] Appl. No.: 09/061,429

[22] Filed: Apr. 16, 1998

[51] Int. Cl.[7] ..................... G06K 5/00

[52] U.S. Cl. ..................... 235/380; 235/384

[58] Field of Search ..................... 235/380–382.5, 235/449, 450, 384, 375, 492–493; 902/2, 25, 26, 27, 28; 340/825.3, 825.31, 825.32, 825.34, 438, 439, 905; 380/23, 25; 116/202

[56] References Cited

U.S. PATENT DOCUMENTS

| | | |
|---|---|---|
| 3,634,880 | 1/1972 | Hawkins . |
| 4,477,874 | 10/1984 | Ikuta et al. . |
| 4,805,722 | 2/1989 | Keating et al. . |
| 4,982,072 | 1/1991 | Takigami . |
| 5,136,284 | 8/1992 | Kitamura . |
| 5,337,358 | 8/1994 | Axelrod et al. . |
| 5,351,302 | 9/1994 | Leighton et al. . |
| 5,420,924 | 5/1995 | Berson et al. . |
| 5,864,623 | 1/1999 | Messina et al. . |

OTHER PUBLICATIONS

Effective Use of Deterrence Approaches to Reduce Alcohol–Impaired Driving; Allan F. Williams; Sep., 1996; Insurance Institute for Highway Safety.

Effects of License Revocation on Drunk–Driving Offenders; Accid. Anal. & Prev. vol. 20, No. 5, pp. 379–391, 1988; Ross & Gonzales.

NBC Nightly News; Jul. 31, 1997.

*Primary Examiner*—K. P. Hantis

*Attorney, Agent, or Firm*—Marshall & Melhorn

[57] ABSTRACT

An operator's license validation system for a motor vehicle which uses an operator's license which is encoded with data. The data encoded includes the expiration date of operating privileges. A card reader is provided which is designed to read the expiration date encoded on the card. The card reader transmits the information encoded on the license to a control unit. The control unit compares the expiration date to the contemporaneous date. If the expiration date has not expired, the control unit activates an indicator. If the expiration date has expired the control unit will not activate the indicator. The indicator is to be mounted a predetermined location that is visible to oncoming traffic.

9 Claims, 2 Drawing Sheets

OPERATOR'S LICENSE VALIDATION SYSTEM

FIELD OF THE INVENTION

The instant invention relates generally to the field of security systems; and, more specifically to method and apparatus for preventing the unauthorized use of motor vehicles.

BACKGROUND

The unauthorized use of a motor vehicle by persons with suspended operating privileges result in great costs to society. According to a recent study in California, 8.5 percent of drivers in fatal crashes were operating a motor vehicle with suspended privileges at the time of the crash. In comparison, only 1.5 percent of the driving population had suspended privileges.

Conventional systems are drawn toward theft deterrent of the vehicle, disabling the vehicle unless proper authority to operate is recognized. U.S. Pat. No. 4,805,722 issued to Keating et al. is one such patent. In Keating, the operation of a vehicle is limited to individuals with proper authorization and for a limited period of time. The operator is provided with an identification card. The identification card identifies the operator and the operator's period of operation is encoded on the card. The card may be a magnetic or an optical card. The information is read by a card reader/time display and compared to the memory of a controller.

If the information provided to the controller is valid in regard to the controller memory, the operator may start the vehicle. If the information is not valid, the controller disengages the ignition switch and fuel line and locks the hood, disabling the vehicle.

Another example is U.S. Pat. No. 5,136,284. The concept of this invention is similar to the '722 patent, however, it is not drawn toward prohibiting starting the vehicle or opening the hood. Rather, the '284 patent discloses locking the steering wheel. If the information provided does not match the memory of the controller, the steering mechanism is locked and an operator is unable to steer the vehicle.

It would be advantageous to have an apparatus which does not disable the vehicle. It would be advantageous to have an apparatus which does not limit use of vehicle to a restricted period or to restricted individuals. No existing invention is designated to insure against the unauthorized use of a vehicle with the above advantages.

SUMMARY OF THE INVENTION

The invention is directed to an operator's license validation system for a motor vehicle. The invention includes a card reader which converts information stored on an operator's card into a plurality of electrical signals. A control unit decodes the signals. The control unit compares the information and determines if the operator has valid privileges. If the privileges are valid, an indicator activates.

The present invention is intended to stop the unauthorized use of a motor vehicle by individuals without valid operating privileges. At the same time, the present invention will not violate an operator's constitutional rights nor will it obtrusively disable the vehicle.

The present invention will allow the owner of a vehicle to loan his vehicle. It will allow unauthorized drivers to use the vehicle on private property. It will also allow use of the vehicle in case of an emergency. In the case of system error or equipment failure an operator may still operate the vehicle. Another advantage of the present invention is that it is not oppressive of an individual's constitutional rights.

Alternate embodiments of the invention may allow for detection of a vehicle operated by someone with restricted privileges. The use of the apparatus may also lead to fewer owners lending their vehicles to an unauthorized user.

Further advantages of this invention will become apparent from consideration of the drawings and ensuring description.

DETAILED DESCRIPTION OF A PREFERRED EMBODIMENT

Figure 2:
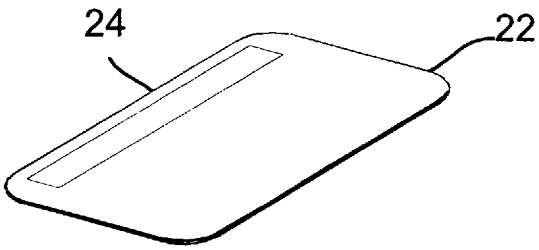
FIG. 2 is a perspective view of an operator's license card with a magnetic strip.
Figure 3:
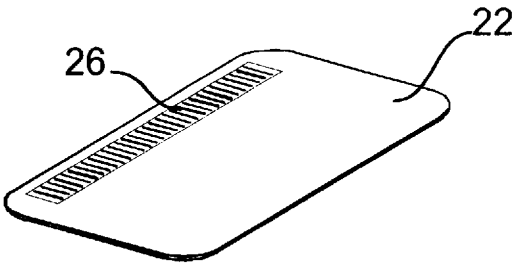
FIG. 3 is a perspective view operator's license card with a bar code.
Figure 4:
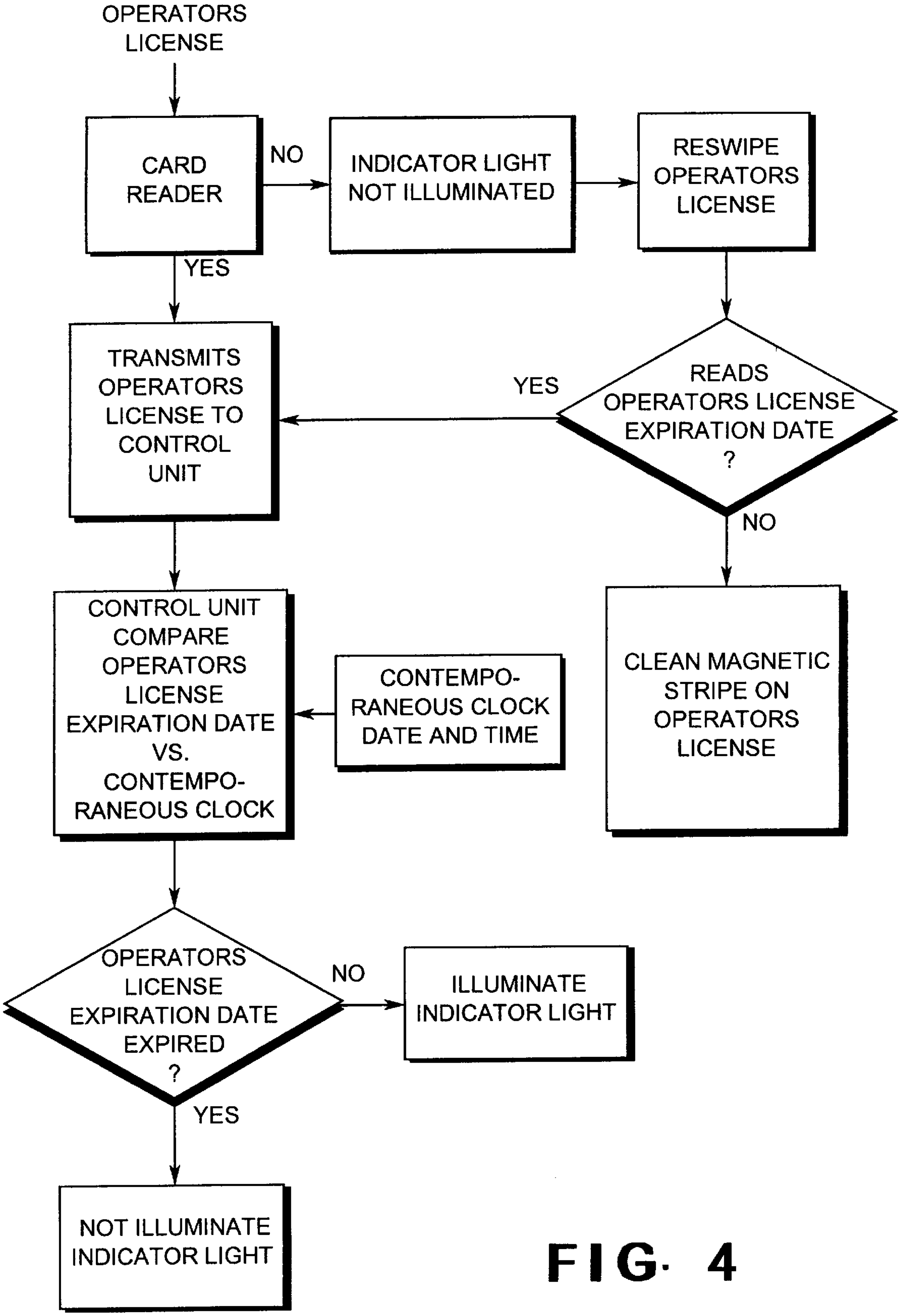
FIG. 4 is a flow diagram of the method of indicating a valid operator's license.

FIG. 2 illustrates an operator's license card 22. The license card 22 is comprised of a flat, planar substrate having a magnetic strip 24 thereon. FIG. 3 is an alternative embodiment, wherein the license 22 contains a bar code 26.

The information stored in the magnetic strip 24 or bar code 26 may range from a description of the operator to restrictions of operating privileges. At a minimum, the information will identify the operator and identify the expiration date of operating privileges. In an alternate embodiment, the information will include restrictions and classifications of an operator's privileges.

Figure 1:
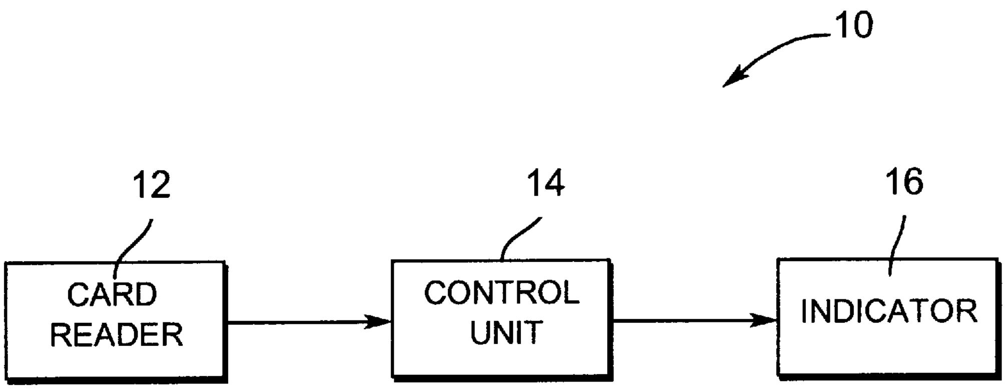
FIG. 1 is a block diagram of the apparatus of the invention.

FIG. 1 is a block diagram of an operator's license validation system 10. This system is designed to deter the unauthorized use of a motor vehicle without violating an operator's constitutional rights. Also, the system does not obtrusively disable the vehicle in the case of equipment failure or another malfunction.

The system includes a card reader 12. In the preferred embodiment, a magnetic card reader is provided. However, any type of card reader compatible with the encoded information on the license card 22 is suitable to practice this invention. An example of a suitable alternative card reader is a bar code reader.

The operator's license 22 is swiped through the card reader 12. The card reader 12 is designed to read the information stored on the license 22. Electrical signals representing the information stored on the license 22 are transmitted to a control unit 14.

The control unit 14 has a continuously updated time and date. The control unit 14 compares the expiration date of operating privileges as stored on the card 22 to the present date and time. If the expiration date has not expired, the control unit 14 activates an indicator 16. If the expiration date has expired, the control unit 14 does not activate the indicator 16.

In an alternative embodiment, the control unit 14 may compare the restrictions of an operator's right to operator a vehicle to stored information. If the restrictions information matches the stored information, the control unit 14 will activate a distinct indicator.

The indicator 16 may consist of a light. The indicator 16 is mounted in the vehicle such that it is visible to oncoming traffic. Therefore, law enforcement personnel approaching said vehicle will be able to observe if the indicator 16 is activated or not. If not, the personnel will have probable cause to stop the vehicle and investigate if the operator has a valid license.

The indicator 16 is not limited to a light. The indicator may be any suitable type of indicator. Moreover, in an alternative embodiment, the off/on could be switched i.e. law enforcement personnel would stop the vehicle if light is illuminated.

In an alternative embodiment, the indicator 16 will consist of a series of colored lights. If an operator's license 22 has a certain restriction a specified colored light will illuminate. This will notify law enforcement officers of a restriction on an operator's right to operate a vehicle.

Another alternative embodiment utilizes the registration lamp as the indicator 16. If the indicator 16 is activated, the registration lamp illuminates. If not, the registration light will not illuminate.

The card reader 12 is to be disposed such that an operator may easily use the reader. The reader may be mounted on the dashboard of a vehicle. Alternatively, the reader 12 may be integrated into the dash board or could be in driver door, between seats, or any other suitable location.

Preferably, the power source of the vehicle provides the power for the operator's license validation system 10. The operator's license validation system 10 is designed such that each time an operator turns off the ignition of the vehicle, the indicator 16 is deactivated.

The impetus of the present invention is to deter unlicensed operators from operating a motor vehicle. Alternatively, if a licensed operator loans his license to a person along with his vehicle, the owner is now on notice that the borrower does not have valid operating privileges. Thus, the owner may not allege lack of knowledge during an unlawful entrustment hearing. Therefore, the apparatus also deters a licensed operator from loaning his vehicle to an unlicensed operator.

Thus, the validation system 10 provides a highly reliable manner to prohibit the unauthorized use of a motor vehicle. However, this invention does not disable the vehicle, allowing it to be used in case of an emergency, on private property, in case of equipment failure, etc.

While certain novel features of this invention have been shown and described and are pointed out in the claims, it is understood that various omissions, substitutions and changes in the forms and the details of the devise illustrated and in its operation can be made by those skilled in the art without departing from the spirit of the invention. Accordingly, the scope of the invention should be determined not only by the embodiment(s) illustrated, but by the appended claims and their legal equivalents.

What is claimed is:

1. An operator's license validation system for a motor vehicle, comprising:

a) a card with encoded information regarding identity and an expiration date of operating privileges;

b) a card reader for decoding said information on said card and converting said information to electrical signals, said card reader is one selected from the group consisting of a magnetic card reader and a bar code reader;

c) a control unit for decoding said electrical signals to compare said information to a contemporaneous date of operation of said vehicle, said control unit creating a signal; and d) a non-vehicle-disabling indicator visible from the outside of said vehicle, said indicator is activated when said control unit determines that said expiration date of operating privileges encoded on said card is later than said contemporaneous date, said indicator consists of a registration lamp of said motor vehicle.

2. An operator's license validation system for a motor vehicle as claimed in claim 1, wherein said card reader is a magnetic card reader.

3. An operator's license validation system for a motor vehicle as claimed in claim 2, wherein said encoded information is encoded on a magnetic encoded strip.

4. An operator's license validation system for a motor vehicle as claimed in claim 1, wherein said card reader is integrated into a dashboard of said motor vehicle.

5. An operator's license validation system for a motor vehicle as claimed in claim 1, wherein said indicator is visible to a law enforcement officer approaching said motor vehicle.

6. An operator's license validation system for a motor vehicle as claimed in claim 1, wherein said indicator is illuminated when activated.

7. An operator's license validation system for a motor vehicle as claimed in claim 1, wherein said indicator is deilluminated when activated.

8. An operator's license validation system as claimed in claim 1, wherein said indicator turns off each time said motor vehicle is turned off.

9. An operator's license validation system for a motor vehicle, comprising:

a) a card with encoded information regarding identity and an expiration date of operating privileges;

b) a card reader for decoding said information on said card and converting said information to electrical signals;

c) a control unit for decoding said electrical signals to compare said information to a contemporaneous date of operation of said vehicle said control unit creating a signal; and d) a non-vehicle-disabling indicator visible from the outside of said vehicle, said indicator is activated when said control unit determines that said expiration date of operating privileges encoded on said card is later than said contemporaneous date; and wherein said indicator consists of a light;

said indicator is visible to a law enforcement officer approaching said motor vehicle; and said light is a vehicle registration lamp of said motor vehicle.

* * * * *